US011521026B2

(12) United States Patent
Lapointe et al.

(10) Patent No.: US 11,521,026 B2
(45) Date of Patent: Dec. 6, 2022

(54) CLASSIFYING INDIVIDUAL ELEMENTS OF AN INFRASTRUCTURE MODEL

(71) Applicant: Bentley Systems, Incorporated, Exton, PA (US)

(72) Inventors: Marc-André Lapointe, Quebec (CA); Karl-Alexandre Jahjah, Quebec (CA); Hugo Bergeron, Quebec (CA); Kaustubh Page, Bee Cave, TX (US)

(73) Assignee: Bentley Systems, Incorporated, Exton, PA (US)

( * ) Notice: Subject to any disclaimer, the term of this patent is extended or adjusted under 35 U.S.C. 154(b) by 77 days.

(21) Appl. No.: 17/034,844

(22) Filed: Sep. 28, 2020

(65) Prior Publication Data
US 2021/0117716 A1 Apr. 22, 2021

Related U.S. Application Data

(60) Provisional application No. 62/923,891, filed on Oct. 21, 2019.

(51) Int. Cl.
*G06K 9/62* (2022.01)
*G06T 17/20* (2006.01)
*G06V 20/64* (2022.01)

(52) U.S. Cl.
CPC .......... *G06K 9/627* (2013.01); *G06K 9/6232* (2013.01); *G06K 9/6256* (2013.01); *G06K 9/6262* (2013.01); *G06T 17/20* (2013.01); *G06V 20/64* (2022.01); *G06T 2200/04* (2013.01)

(58) Field of Classification Search
None
See application file for complete search history.

(56) References Cited

U.S. PATENT DOCUMENTS

| 7,639,868 B1 | 12/2009 | Regli et al. |
| 7,889,914 B2 | 2/2011 | Regli et al. |
| 8,056,001 B2 | 11/2011 | Chao |
| 8,612,373 B2 | 12/2013 | Chidlovskii |
| 9,141,925 B2 | 12/2015 | Jung et al. |
| 9,256,836 B2 | 2/2016 | Ludlow et al. |
| 9,501,744 B1 | 11/2016 | Brisebois et al. |
| 10,297,070 B1 * | 5/2019 | Zhu ...................... G06T 15/205 |
| 10,353,916 B2 | 7/2019 | Bentley et al. |

(Continued)

OTHER PUBLICATIONS

Chen et al. (WO 2013/123672), "Generating an Operational User Interface for a Building Management System", published: Aug. 29, 2013 (Year: 2013).*

*Primary Examiner* — Saptarshi Mazumder
(74) *Attorney, Agent, or Firm* — Cesari and McKenna, LLP; James A. Blanchette

(57) ABSTRACT

In example embodiments, techniques are provided to automatically classify individual elements of an infrastructure model by training one or more machine learning algorithms on classified infrastructure models, producing a classification model that maps features to classification labels, and utilizing the classification model to classify the individual elements of the infrastructure model. The resulting classified elements may then be readily subject to analytics, for example, enabling the display of dashboards for monitoring project performance and the impact of design changes. Such techniques enable classification of elements of new infrastructure models or in updates to existing infrastructure models.

21 Claims, 6 Drawing Sheets

(56) References Cited

U.S. PATENT DOCUMENTS

| | | |
|---|---|---|
| 2011/0096083 A1 | 4/2011 | Schultz |
| 2014/0278268 A1 | 9/2014 | Woolsey |
| 2016/0379083 A1* | 12/2016 | Sala ............ G06T 19/006 345/633 |
| 2017/0090460 A1* | 3/2017 | Andrew ............ B29C 64/386 |
| 2020/0057824 A1* | 2/2020 | Yeh ............ G06N 20/00 |

* cited by examiner

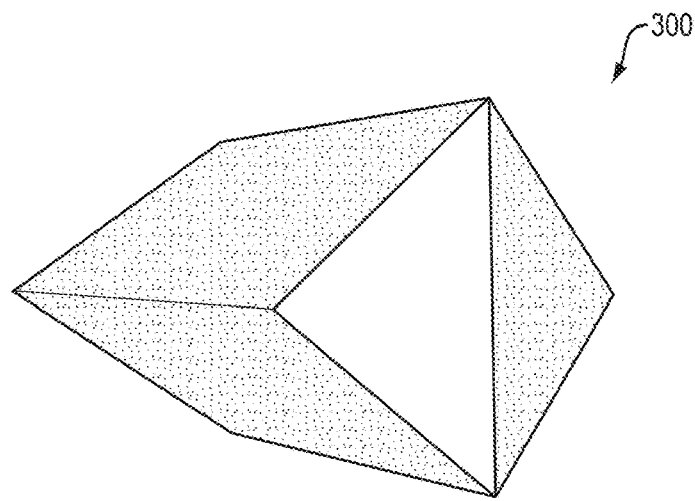
FIG. 3
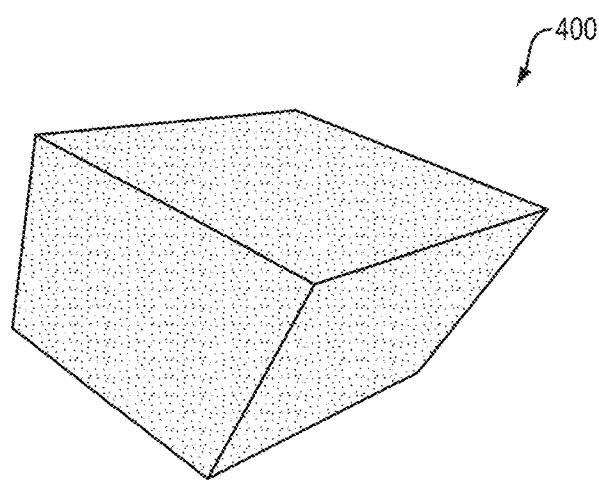
FIG. 4
Volume: 1.24563
Surface area: 4.31224
Length: 1.01286
Width: 0.84256
Height: 1.45958
Ixx: 2.5521
Iyy: 1.5414
FIG. 5

CLASSIFYING INDIVIDUAL ELEMENTS OF AN INFRASTRUCTURE MODEL

RELATED APPLICATIONS

This application claims the benefit of U.S. Provisional Patent Application No. 62/923,891 filed on Oct. 21, 2019 by Marc-André Lapointe et al., titled "Classifying Individual Elements of an Infrastructure Model", the contents of which are incorporated by reference herein in their entirety.

BACKGROUND

Technical Field

The present disclosure relates generally to infrastructure modeling, and more specifically to techniques used to classify elements of an infrastructure model.

Background Information

In the design, construction and/or operation of infrastructure (e.g., buildings, factories, roads, railways, bridges, electrical and communication networks, equipment, etc.) it is often desirable to create infrastructure models. An infrastructure model may maintain a built infrastructure model (BIM) or digital twin of infrastructure. A BIM is a digital representation of infrastructure as it should be built, providing a mechanism for visualization and collaboration. A digital twin is a digital representation of infrastructure as it is actually built, and is often synchronized with information representing current status, working condition, position or other qualities.

It is often necessary to classify individual elements of an infrastructure model (e.g., maintaining a BIM or digital twin) in order to execute analytical tools on the model, for example, analytical tools that measure and provide dashboards for monitoring project performance (e.g., schedule, cost, and safety compliance) and the impact of design changes. The classification label of an element may indicate the element belongs to one of a number of standard classes (e.g., beam, wall, column, window, door, pipe, etc.) that permits the element to be grouped together with other similar elements. Without classification labels, running analytics may be impossible.

Infrastructure models (e.g., maintaining BIMs or digital twins) may be constructed by federating data from distributed sources. These data sources may include different amounts of classification information that utilize various different types of nomenclature. It is often impractical to establish standards for classification information and nomenclature so it is all coherent at the source. Even if standards are established, if consistency is not rigorously monitored, an organization or vendor may introduce a non-compliant data source. Further, even if this challenge could be overcome with perfect standards enforcement, sometimes classification information may be lost in the translations and conversions performed when federating the data.

Manual attempts may be made to classify elements once in an infrastructure model. However, infrastructure models may include millions of individual elements, which if manually classified could consume extreme amounts of time. Further, infrastructure models may be synchronized and updated frequently to reflect current status, which would require manual classification to be performed on a near-continuous basis. Such requirements render manual classification of elements once in an infrastructure model impractical.

Accordingly, there is a need for improved techniques to address the problem of classifying individual elements of an infrastructure model.

SUMMARY

In example embodiments, techniques are provided to automatically classify individual elements of an infrastructure model by training one or more machine learning algorithms on classified infrastructure models, producing a classification model that maps features to classification labels, and utilizing the classification model to classify the individual elements of the infrastructure model. The resulting classified elements may then be readily subject to analytics, for example, enabling the display of dashboards for monitoring project performance and the impact of design changes. Such techniques enable classification of elements of new infrastructure models or updates to existing infrastructure models. They may overcome a variety of issues of prior techniques, including data sources providing differing amounts of classification information with different nomenclatures, loss of classification information during translation/conversion, and extreme time requirements for manual classification.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIG. 3 is a view of an example 3D mesh (i.e. a raw 3D mesh) that may be built as part of the operations of a step of FIG. 2;

FIG. 4 is a view of an example manifold 3D mesh that may be produced from the example 3D mesh of FIG. 3 as part of the operations of a step of FIG. 2;

FIG. 5 is an example vector of features (here, including geometric features) that may be produced by operation of a step of FIG. 2 on the example manifold 3D mesh of FIG. 4.

DETAILED DESCRIPTION

Definitions

As used herein, the term "infrastructure" refers to a physical structure or object that has been built, or is planned to be built, in the real-world. Examples of infrastructure include buildings, factories, roads, railways, bridges, electrical and communication networks, equipment, etc.

As used herein, the term "infrastructure model" refers to a digital twin, built infrastructure model (BIM) or other representation of infrastructure. One specific type of infrastructure model may be the iModel® infrastructure model.

As used herein, the term "repository," refers to a distributed database that stores one or more infrastructure models. Each constituent database of such a distributed database may be referred to as a "briefcase," as discussed below.

As used herein, the term "changeset" refers to a persistent electronic record that captures changes needed to transform a particular instance of a database from one version to a new version.

As used herein, the term "briefcase" refers to a particular instance of a database. In example implementations, when a briefcase is used as a constituent database of a repository, the briefcase may represent a materialized view of the information of a specific version of the repository.

As used herein, the term "element" refers to a record maintained in a briefcase. An element represents (i.e. "models", in a colloquial sense of the term) an entity. In example implementations, the entity may be an individual unit of infrastructure.

As used herein, the term "model" refers to a container for a set of elements where the set of elements collectively represent (i.e. "model", in a colloquial sense of the term) an entity. In example implementations, the entity may be an individual unit of infrastructure. In some cases, models may nest. That is, a model is said to "break down" a particular element into a finer-grained description.

As used herein, the term "relationship" refers to a connection that relates two or more elements or models. Examples of relationships include parent-child relationships that may imply ownership and peer-peer relationships that may define groups.

Example Embodiments

Figure 1:
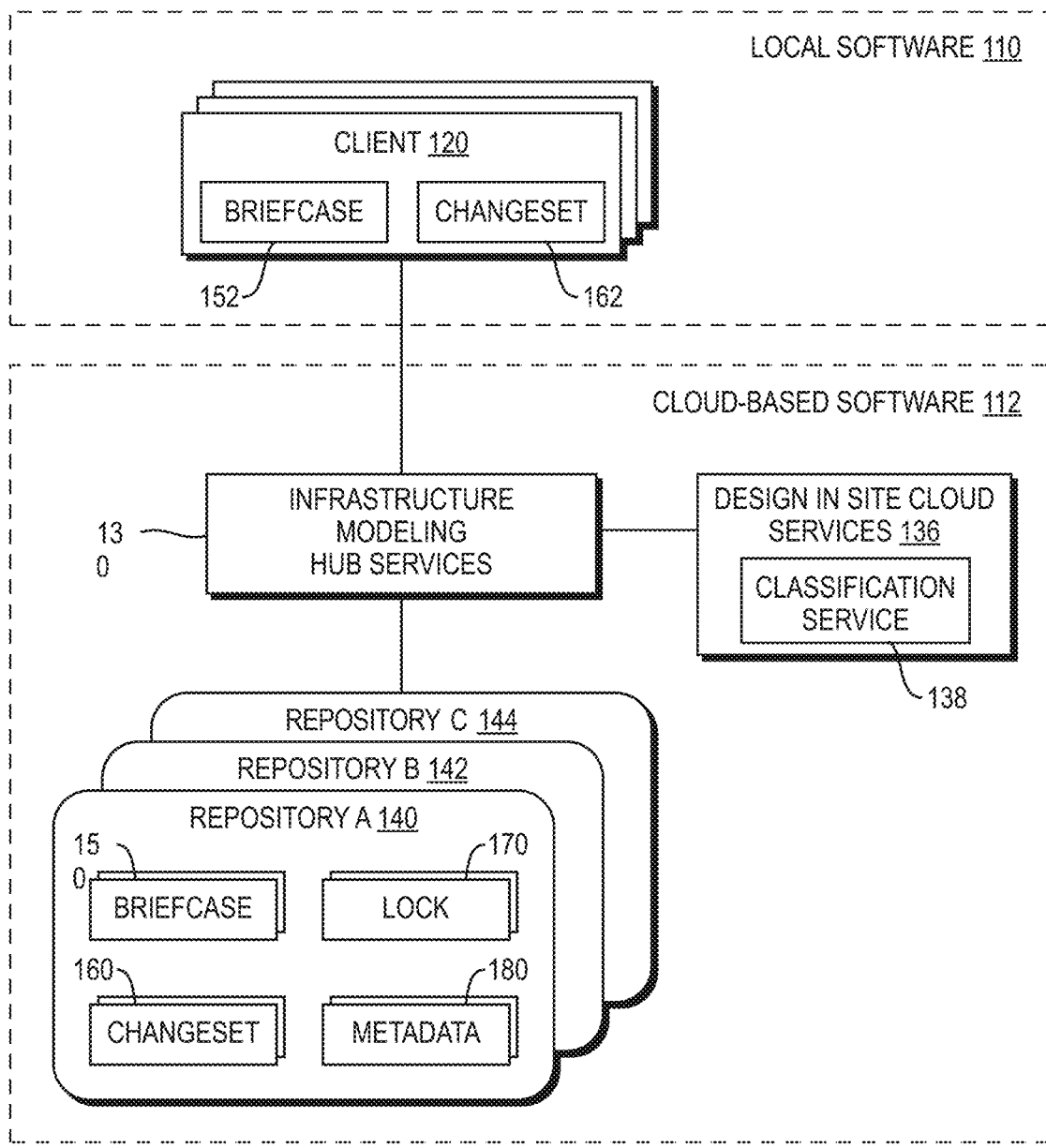
FIG. 1 is a high-level block diagram of at least a portion of an example software architecture.

FIG. 1 is a high-level block diagram of at least a portion of an example software architecture. The architecture may be divided into client-side software 110 executing on one more or more computing devices arranged locally (collectively "client devices"), and cloud-based services software 112 executing on one or more remote computing devices ("cloud computing devices") accessible over the Internet.

The client-side software 110 may include client software applications (or simply "clients") 120 operated by users. The clients 120 may be of various types, including desktop clients that operate directly under an operating system of a client device and web-based client applications that operate within a web browser. The clients 120 may be concerned mainly with providing user interfaces that allow users to create, modify, display and/or otherwise interact with infrastructure models (e.g. iModel® infrastructure models) which maintain digital twins or BIMs for infrastructure. The cloud-based software 112 may include infrastructure modeling hub services (e.g., iModelHub™ services) 130 other services software that manage repositories 140-144 that maintain the infrastructure models. The clients 120 and the infrastructure modeling hub services 130 may utilize a built infrastructure schema (BIS) that describes semantics of data representing infrastructure, using high-level data structures and concepts. The BIS may utilize (be layered upon) an underlying database system (e.g., SQLite) that handles primitive database operations, such as inserts, updates and deletes of rows of tables of underlying distributed databases (e.g., SQLite databases). The database system may utilize an underlying database schema (e.g., a SQLite schema) that describes the actual rows and columns of the tables.

In more detail, the conceptual schema (e.g., BIS), may describe infrastructure using elements, models, and relationships, which serve as building blocks of an infrastructure model. Physical information may serve as a "backbone", and non-physical information (e.g., analytical information, functional information, etc.) may be maintained relative to (e.g., augmenting) the "backbone." Elements represent (i.e. "model", in a colloquial sense of the term) individual entities. One element may be the "lead" element, based on the nature of the entity being modeled. Other elements typically relate back the lead element. A model acts as a container for a set of elements where the set of elements collectively represent (i.e. "model", in a colloquial sense of the term) an entity. In some cases, models may nest. That is, a model is said to "break down" a particular element into a finer-grained description. Models may be arranged according to a model hierarchy to support modeling from multiple perspectives. A single repository model may serve as a root of the model hierarchy. Relationships relate two or more elements or models. Examples of relationships include parent-child relationships that may imply ownership and peer-peer relationships that may define groups.

Likewise, the underlying database schema (e.g., a DgnDb schema) may describe how the objects are stored to individual rows of tables of the underlying databases. Elements, models and relationships may be maintained using rows of tables, which store their properties. For example, properties of an element may be stored in multiple rows of multiple tables. Such properties may include placement, size, and geometry. The geometry may include a description of vertices and faces. To create, remove or modify an object, primitive database operations such as inserts, deletes or updates are performed by the underlying database system upon the appropriate rows of the appropriate tables.

To enable multiple versions and concurrent operation, briefcases and changesets may be utilized by the clients 120 and infrastructure modeling hub services 130. A briefcase is a particular instance of a database, that when used as a constituent database of a repository 140-144, represents a materialized view of the information of a specific version of the repository. Initially an "empty" baseline briefcase may be programmatically created. Over time the baseline briefcase may be modified with changesets, which are persistent electronic records that capture changes needed to transform a particular instance from one version to a new version. A changeset often includes original values (pre-change) values of selected properties of objects as well as the new (changed) values of those selected properties.

Infrastructure modeling hub services 130 may maintain briefcases 150 and a set of accepted changesets 160 (i.e. changesets that have been successfully pushed) in a repository 140-144. The infrastructure modeling hub services 130 may also maintain locks and associated metadata in the repository 140-144. When a client 120 desires to operate upon an infrastructure model, it may obtain the briefcase 150 from a repository 140-144 closest to the desired state and those accepted changesets 160 from the repository 140-144 that when applied bring that briefcase up to the desired state. To avoid the need to constantly access the repository 140-144, clients may maintain a copy of a local copy 152 (a local instance of the database).

When a client 120 desires to make changes to the infrastructure model, it may use the database system to preform primitive database operations, such as inserts, updates and deletes, on rows of tables of its local copy. The client 120 records these primitive database operations and eventually bundles them to create a local changeset 162. At this stage, the local changeset 162 represents pending changes to the infrastructure model, that are reflected locally on the client 120, but that have not yet been accepted to be shared with other clients. Subsequently, the client 120 may push the local changeset 162 back to infrastructure model hub services 130 to be added to the set of accepted changesets 160 in a repository 140-144.

The infrastructure modeling hub services (e.g., iModelHub™ services) 130 may interact with a number of other services in the cloud, that perform information management and support functions. For example, information management services (not shown) may manage asset data, project data, reality data, Internet of Things (IoT) data, codes, and other features. One such service may be a design insights cloud service 136 that evaluates the impact of design changes on performance of the infrastructure model, including project schedule, cost, and safety compliance. The design insights cloud service 136 may include a classification service 138 that is capable of automatically classify individual elements of an infrastructure model by training one or more machine learning algorithms to produce a classification model, and later utilizing the classification model to classify the individual elements of the infrastructure models. To that end, the classification service 138 may include a data loading module, data cleaning module, a data featuring module, a data splitting module, a training module, a prediction module, and set of one or more machine learning algorithms. A wide variety of additional services (not shown) may also be provided that interact with infrastructure modeling hub services (e.g., iModelHub™ services) 130.

Figure 2:
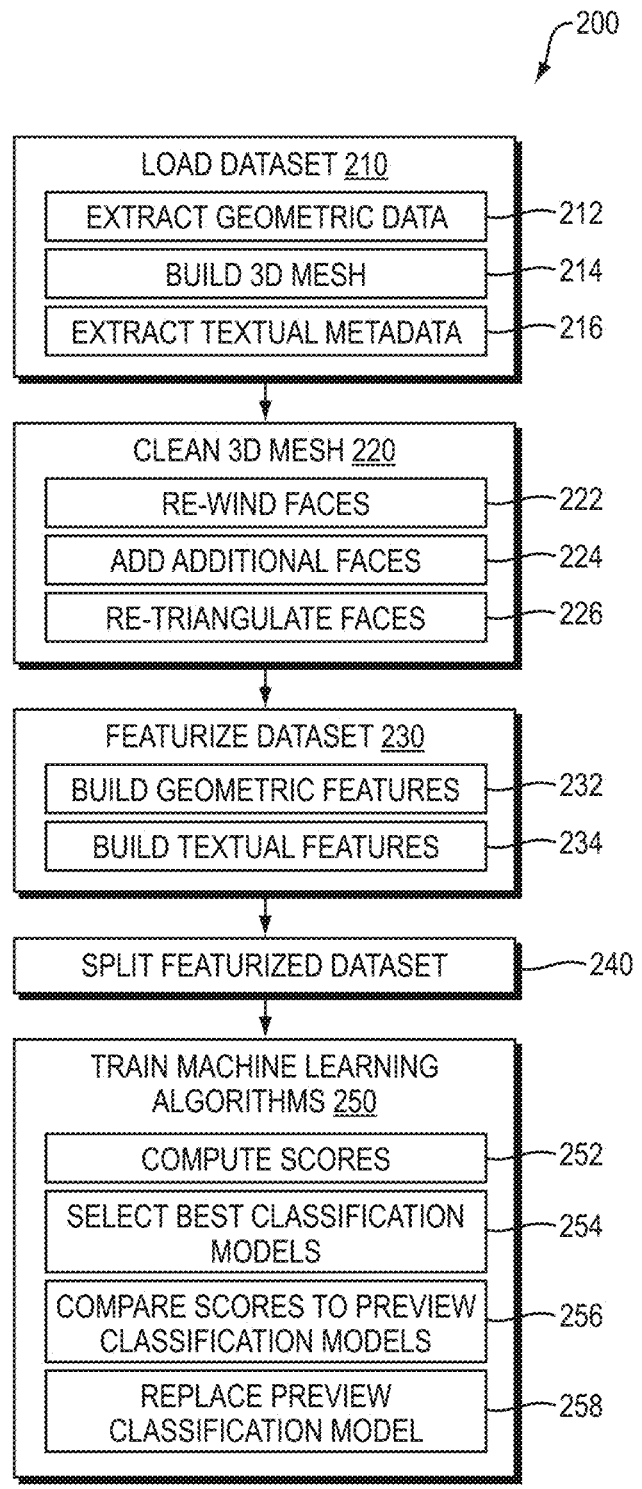
FIG. 2 is a flow diagram of example operations that may be implemented at least in part by the classification service of the design insights cloud service to train one or more machine learning algorithms to produce a classification model.

FIG. 2 is a flow diagram of example operations that may be implemented at least in part by the classification service 138 of the design insights cloud service 136 to train one or more machine learning algorithms to produce a classification model. At step 210, the data loading module of the classification service 138 loads a dataset from an infrastructure model that includes classified elements which have associated classification labels. In some cases, the classified elements may be organized in a hierarchical manner according to one or more user schemas. The building may include the substep 212 of extracting geometric data that describes geometry of classified elements, the substep 214 of building a 3D mesh (i.e. a raw 3D mesh) using vertices and faces indicated in the geometry data, and the substep 216 of extracting textual metadata for the classified elements.

FIG. 3 is a view 300 of an example 3D mesh (i.e. a raw 3D mesh) that may be built as part of the operation of step 210. For purposes of illustration, the 3D mesh is quite simple and includes a single feature. It should be understood, however, that typically the 3D mesh will be far more complex and include a number of features. The example 3D mesh (i.e. raw 3D mesh) may be open, have missing faces, duplicate vertices, etc.

At step 220, the data cleaning module of the classification service 138 cleans the 3D mesh (i.e. the raw 3D mesh) to transform the 3D mesh into a manifold 3D mesh (i.e. a "watertight" 3D mesh consisting of one closed surface that does not contain holes, missing faces, etc. and has a clearly defined inside). Transforming the 3D mesh to be manifold may include the substep 212 of re-winding one or more faces of the 3D mesh, the substep 224 of adding one or more additional faces to the 3D mesh to fill holes, and/or the substep 226 of re-triangulating one or more faces of the 3D mesh, among other operations.

FIG. 4 is a view 400 of an example manifold 3D mesh that may be produced from the example 3D mesh of FIG. 3 as part of the operation of step 220.

The cleaned 3D mesh and the textual metadata are then supplied to the data featuring module of the classification service 138. At step 230, the data featuring module of the classification service 138 featurizes the dataset by building a vector of features that act as descriptors for each classified element. Some features are geometric and, at substep 232, are built by analyzing the manifold 3D mesh. Such features include metric features that scale with size of the element (e.g., volume, surface area, length, width, height, etc.), dimension-less features that describe shape of the element regardless of its dimensions (e.g., length over height ratio), and global features that describe position and/or dimension of the element with respect to the infrastructure model as a whole. Other features are textual and, at substep 234, are built by analyzing the textual metadata. Such analysis may include frequency-inverse document frequency (TFIDF) techniques that highlight how important a word is to the infrastructure model as a whole and how likely it can serve as a predictive word token.

FIG. 5 is an example vector of features (here, including geometric features) that may be produced by operation of step 230 on the example manifold 3D mesh of FIG. 4.

At step 240, the data featuring module of the classification service 138 splits the featurized dataset into a training dataset and a validation dataset. In some embodiments, data may be spit first into a number of folds. If k is the number of fold, then in each fold every instance will be semi-randomly assigned either to training of validation set. This enables averaging the performance on a trained model across different splits of the data to tune the model type and hyper-parameters while maintaining independence from the specific train/validation split. Care may be taken to not keep too many identical elements that differ only by position (e.g., elements representing multiple parallel beams) in each fold/training set. Identical elements must also not be present in both the training and validation set to prevent overfitting by memorizing the training data.

At step 250, the training module of the classification service 138 trains one or more machine learning algorithms using the vectors of features and the associated classification label of classified elements of the training datasets, and validates the training using the validation datasets. The training produces one or more classification models that associate determined predictive features (e.g., geometric and textual) with corresponding classification labels. The machine learning algorithms may include a Random Forest, Gradient Boosting Tree, Support Vector Classifier, Naive Bayes Classifier, K-Nearest-Neighbours Classifier, Recursive Feature Elimination with Cross-Validation, Term-Frequency Inverse-Document-Frequency, Multiple Instance Learning, Point-Net, Point-Net++ or other known machine learning algorithm. The training may include the substep 252 of computing scores for potential classification models evaluated against a validation set or an average against validation sets in the case of k-fold splitting, and the substep 254 of selecting one or more best classification model based on the score. In order to retrain the machine learning algorithms where there were previous classification models, the training may include the substep 256 of comparing the scores of the one or more best classification models to scores of one or more previous classification models, and the substep 258 of replacing a previous classification model with a best classification model if it offers better performance.

Figure 6:
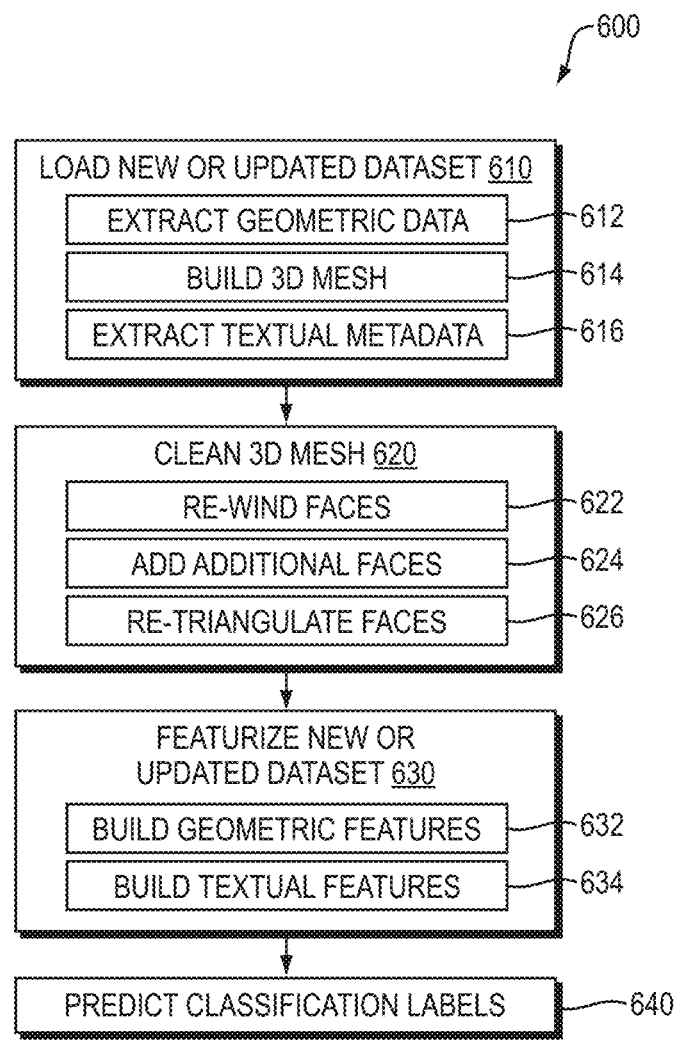
FIG. 6 is a flow diagram of example inference operations that may be implemented at least in part by the classification service of the design insights cloud service to predict classification labels for individual elements of a new or updated infrastructure model.

The one or more best classification models may be used in inference operations to predict classification labels for individual elements of a new or updated infrastructure model. FIG. 6 is a flow diagram of example inference operations that may be implemented at least in part by the classification service 138 of the design insights cloud service 136 to predict classification labels for individual elements of a new or updated infrastructure model. Many of the operations may be similar to those described above in reference to FIG. 2 for training. At step 610, the data loading module of the classification service 138 loads a new or updated dataset from a new or updated infrastructure model that includes unclassified elements lacking classification labels. In some cases, the unclassified elements may be organized with other elements in a hierarchical manner according to one or more user schemas. Such schemas may group elements into categories at various levels of the hierarchy. Step 610 may include the substep 612 of extracting geometric data that describes geometry of unclassified elements, the substep 614 of building a 3D mesh using vertices and faces indicated in the geometry data, and the substep 616 of extracting textual metadata for the unclassified elements.

At step 620, the data cleaning module of the classification service 138 cleans the new or updated 3D mesh to transform the new or updated 3D mesh into a manifold 3D mesh. Transforming the new or updated 3D mesh to be manifold may include the substep 612 of re-winding one or more faces of the new or updated 3D mesh, the substep 624 of adding one or more additional faces to the new or updated 3D mesh to fill holes, and/or the substep 626 of re-triangulating one or more faces of the new or updated 3D mesh, among other operations. The cleaned new or updated 3D mesh and the textual metadata are then supplied to the data featuring module of the classification service 138.

At step 630, the data featuring module of the classification service 138 featurizes the new or updated dataset by building a vector of features that act as descriptors for each unclassified element. Some features are geometric and, at substep 632, are built by analyzing the manifold new or updated 3D mesh. Other features are textual and, at substep 634, are built based by analyzing the textual metadata. The produced vector of features for an element may be similar to the vector shown in FIG. 5 above.

At step 640, the prediction module of the classification service 138 utilizes the one or more classification models to predict classification labels of unclassified elements of the new or updated infrastructure model.

In some embodiments, as part of step 640, the prediction module of the classification service 138 may also utilize multiple instance learning to leverage hierarchical information present in the according to one or more user schemas to further refine the predictions from the one or more classification models. For example, the prediction module may apply a higher prior probability that elements grouped together in the hierarchy (e.g., in a same category) of a user schema have a higher likelihood to belong to the same classification than elements that are not grouped together in the hierarchy (e.g., in a same category) of the user schema, and predictions may be adjusted based thereupon.

The predicted classification labels are then stored in the new or updated infrastructure model. The new or updated infrastructure model with the classification labels may be used to display a view, update a dashboard, etc. in a user interface of the design insights cloud service 136 or of other software. Analytics may be readily run on the infrastructure model now that is has appropriate classification labels.

Figure 7:
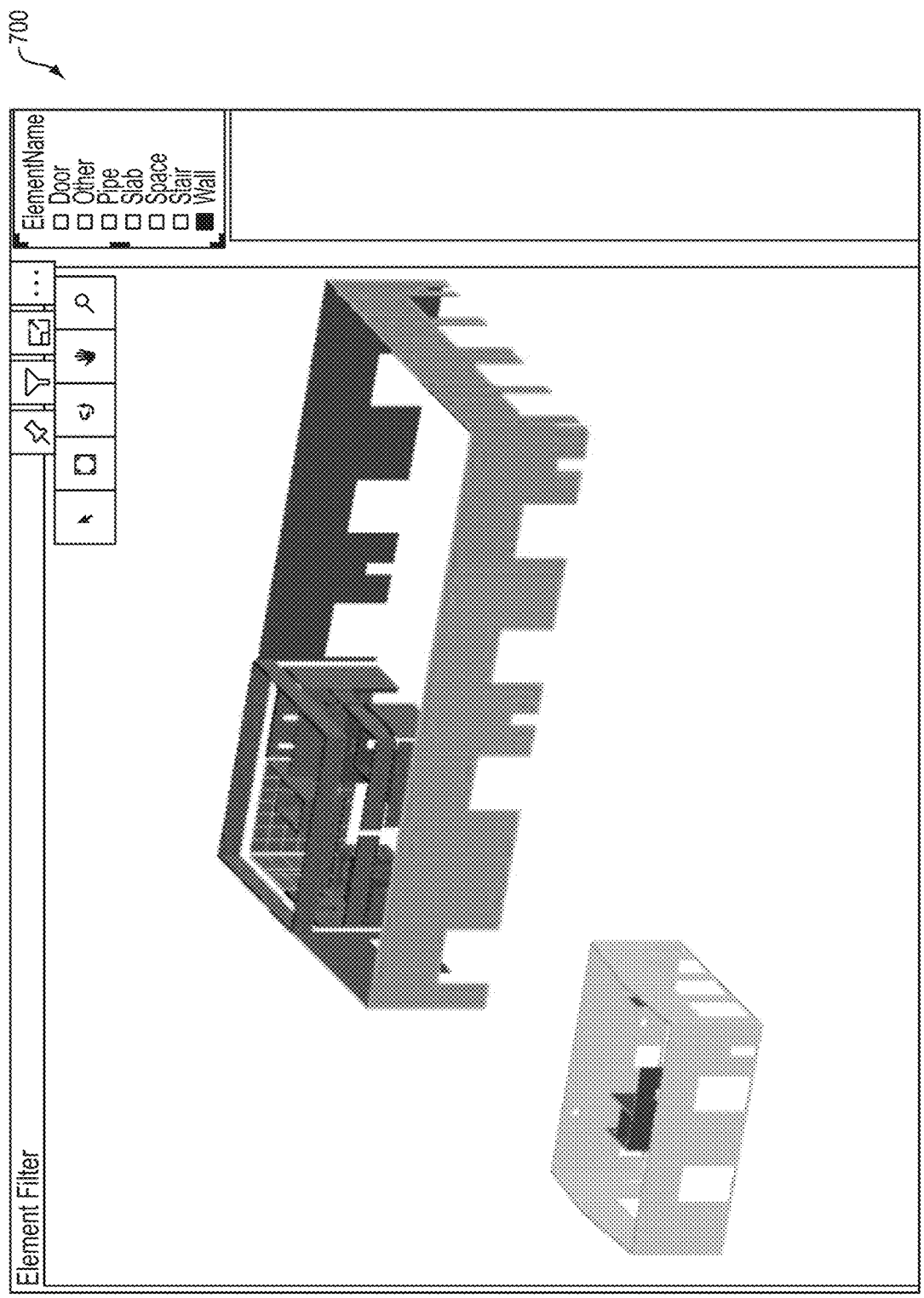
FIG. 7 is a first view of an example new or updated infrastructure model with classification labels (here showing elements classified as walls highlighted), which may be produced as a result of operation of the steps of FIG. 6.
Figure 8:
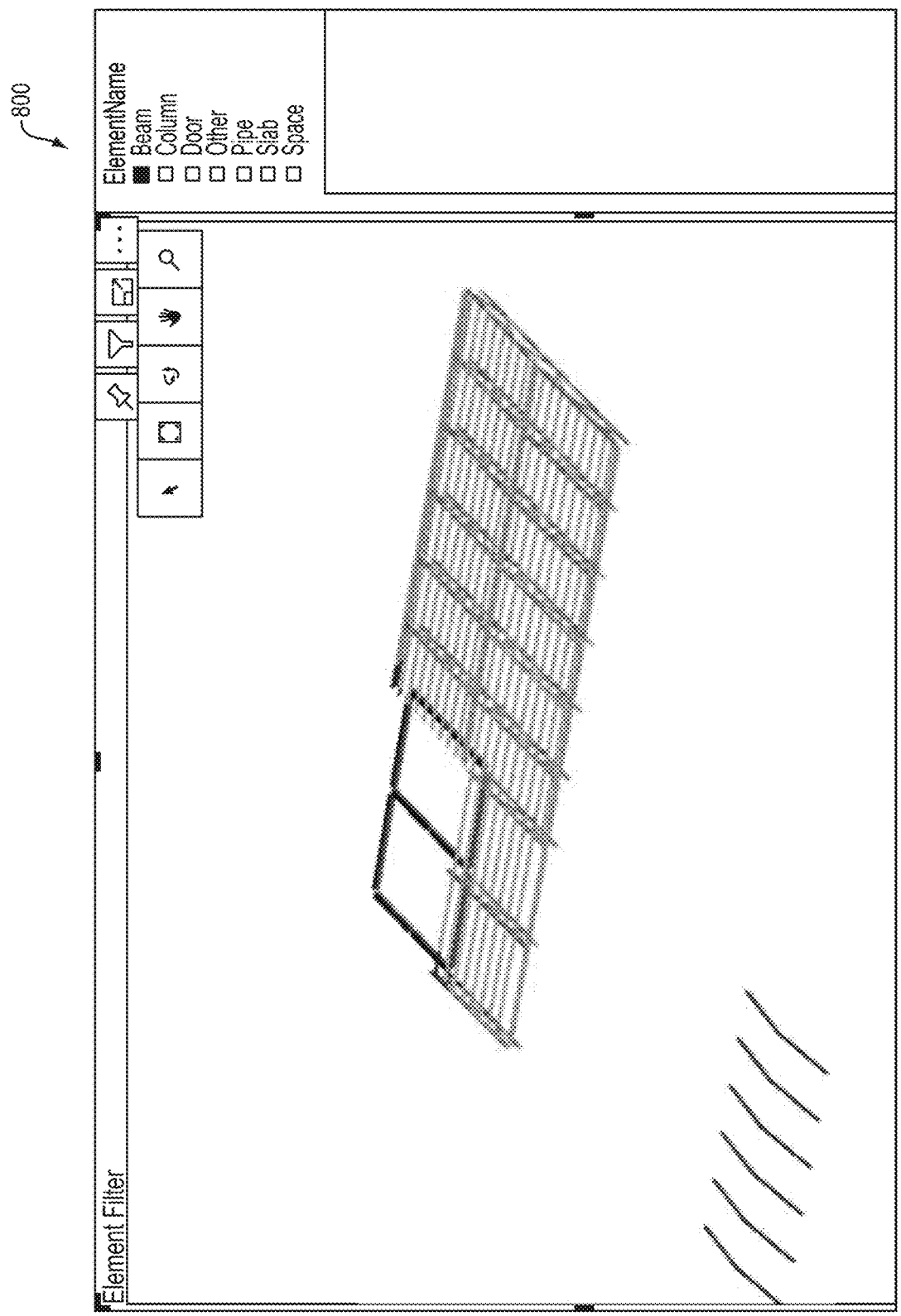
FIG. 8 is a second view of an example new or updated infrastructure model with classification labels (here showing elements classified as beams highlighted), which may be produced as a result of operation of the steps of FIG. 6.

FIG. 7 is a first view 700 of an example new or updated infrastructure model with classification labels (here showing elements classified as walls highlighted), which may be produced as a result of operation of the steps of FIG. 6. FIG. 8 is a second view 800 of an example new or updated infrastructure model with classification labels (here showing elements classified as beams highlighted), which may be produced as a result of operation of the steps of FIG. 6.

It should be understood that a wide variety of adaptations and modifications may be made to the techniques. Further, in general, functionality may be implemented using different software, hardware and various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for automatically classifying individual elements of a new or updated infrastructure model, comprising:
    loading a dataset from an infrastructure model that includes classified elements that each have an associated classification label, the loading to include generating a three-dimensional (3D) mesh including the classified elements;
    cleaning the 3D mesh to transform the 3D mesh into a manifold 3D mesh;
    building, by a classification service executing on one or more computing devices, a vector of features for each classified element using the manifold 3D mesh;
    training, by the classification service, one or more machine learning algorithms using the vector of features and the associated classification label of classified elements of at least a subset of the dataset, the training to produce one or more classification models;
    loading a dataset from new or updated infrastructure model that includes unclassified elements; and
    utilizing, by the classification service, the one or more classification models to predict a classification label for the unclassified elements.

2. The method of claim 1, wherein the cleaning comprises at least one of:
    re-winding one or more faces of the 3D mesh,
    adding one or more additional faces to the 3D mesh to fill holes, or
    re-triangulating one or more faces of the 3D mesh.

3. The method of claim 1, further comprising:
splitting the dataset into a set of a training dataset and a validation dataset, and
wherein the training one or more machine learning algorithms utilizes the training dataset.

4. The method of claim 3, further comprising:
computing a score for a potential classification model using at least one validation dataset;
selecting a best classification model from the potential classification models based on the score; and
utilizing the best classification model to classify the individual elements of the new or updated infrastructure model.

5. The method of claim 4, further comprising:
comparing the score of the best classification model to a score of one or more previous classification models; and
replacing a previous classification model with a best classification model in response to the comparing to retrain the one or more machine learning algorithms.

6. The method of claim 4, wherein the splitting is k-fold splitting and the selecting the best classification model is based on an average of scores.

7. The method of claim 1, wherein the utilizing the one or more classification models further comprises:
loading a new or updated dataset from the new or updated infrastructure model that includes unclassified elements lacking an associated classification label, the loading to include generating a new or updated dataset 3D mesh;
building, by the classification service, a vector of features for each unclassified element using the new or updated 3D mesh; and
predicting, by the one or more machine learning algorithms using the one or more classification models and the vector of features for each unclassified element, a classification label of each unclassified element.

8. The method of claim 7, further comprising:
cleaning the new or updated 3D mesh to transform the new or updated 3D mesh into a manifold new or updated 3D mesh,
wherein the building the vector of features for each unclassified element using the new or updated 3D mesh uses the manifold new or updated 3D mesh.

9. The method of claim 1, wherein the infrastructure model maintains a built infrastructure model (BIM) or digital twin of infrastructure that is built or is to be built.

10. A method for automatically classifying individual elements of a new or updated infrastructure model, comprising:
loading a dataset from an infrastructure model that includes classified elements that each have an associated classification label, the loading to include generating a three-dimensional (3D) mesh including the classified elements;
building, by a classification service executing on one or more computing devices, a vector of features for each classified element using the 3D mesh and the dataset, wherein the features include geometric features built using the 3D mesh and textual features build from textual metadata from the dataset;
training, by the classification service, one or more machine learning algorithms using the vector of features and the associated classification label of classified elements of at least a subset of the dataset, the training to produce one or more classification models;
loading a dataset from new or updated infrastructure model that includes unclassified elements; and
utilizing, by the classification service, the one or more classification models to predict a classification label for the unclassified elements.

11. The method of claim 10, wherein the vector of features includes one or more features that are metric that scale with size of the element.

12. The method of claim 10, further comprising:
wherein the vector of features includes one or more features that are dimension-less that describe shape of the element regardless of dimensions thereof.

13. The method of claim 10, further comprising:
splitting the dataset into a set of a training dataset and a validation dataset, and
wherein the training one or more machine learning algorithms utilizes the training dataset.

14. The method of claim 13, further comprising:
computing a score for a potential classification model using at least one validation dataset;
selecting a best classification model from the potential classification models based on the score; and
utilizing the best classification model to classify the individual elements of the new or updated infrastructure model.

15. The method of claim 10, further comprising:
refining the predicted classification label for the unclassified elements based on a hierarchy of elements in a user schema for the new or updated infrastructure model, wherein elements grouped together in the hierarchy are provided a higher likelihood of having a same classification label.

16. A method for automatically classifying individual elements of a new or updated infrastructure model, comprising:
loading a dataset from an infrastructure model that includes classified elements that each have an associated classification label, the loading to include generating a three-dimensional (3D) mesh including the classified elements;
building, by a classification service executing on one or more computing devices, a vector of features for each classified element using the 3D mesh, wherein the vector of features includes one or more features that are dimension-less that describe shape of the element regardless of dimensions thereof;
training, by the classification service, one or more machine learning algorithms using the vector of features and the associated classification label of classified elements of at least a subset of the dataset, the training to produce one or more classification models;
loading a dataset from new or updated infrastructure model that includes unclassified elements; and
utilizing, by the classification service, the one or more classification models to predict a classification label for the unclassified elements.

17. A method for automatically classifying individual elements of a new or updated infrastructure model, comprising:
loading a dataset from an infrastructure model that includes classified elements that each have an associated classification label, the loading to include generating a three-dimensional (3D) mesh including the classified elements;
building, by a classification service executing on one or more computing devices, a vector of features for each classified element using the 3D mesh, wherein the vector of features includes one or more features that are global that describe position and/or dimension of the element with respect to the infrastructure model as a whole;

training, by the classification service, one or more machine learning algorithms using the vector of features and the associated classification label of classified elements of at least a subset of the dataset, the training to produce one or more classification models;

loading a dataset from new or updated infrastructure model that includes unclassified elements; and utilizing, by the classification service, the one or more classification models to predict a classification label for the unclassified elements.

18. A method for automatically classifying individual elements of a new or updated infrastructure model, comprising:

loading a dataset from an infrastructure model that includes classified elements that each have an associated classification label, the loading to include generating a three-dimensional (3D) mesh including the classified elements;

building, by a classification service executing on one or more computing devices, a vector of features for each classified element using the 3D mesh;

training, by the classification service, one or more machine learning algorithms using the vector of features and the associated classification label of classified elements of at least a subset of the dataset, the training to produce one or more classification models;

loading a dataset from new or updated infrastructure model that includes unclassified elements; and utilizing, by the classification service, the one or more classification models to predict a classification label for the unclassified elements;

refining the predicted classification label for the unclassified elements based on a hierarchy of elements in a user schema for the new or updated infrastructure model, wherein elements grouped together in the hierarchy are provided a higher likelihood of having a same classification label.

19. A non-transitory electronic device readable medium having instructions that when executed on one or more processors of one or more electronic devices are operable to:

load a dataset from a new or updated infrastructure model that includes unclassified elements lacking an associated classification label, the dataset to include a new or updated three-dimensional (3D) mesh including the unclassified elements;

clean the new or updated 3D mesh to transform the new or updated 3D mesh into a manifold new or updated 3D mesh;

build a vector of features for each unclassified element using the manifold new or updated 3D mesh; and predict, using one or more machine learning algorithms with one or more Classification models and the vector of features for each unclassified element, a classification label of each unclassified element to classify the individual elements of the new or updated infrastructure model.

20. The non-transitory electronic device readable medium of claim 19, further comprising instructions that when executed are operable to:

load another dataset from an infrastructure model that includes classified elements that each have an associated classification label, the another dataset to include a 3D mesh including the classified elements;

build a vector of geometric features for each classified element using the 3D mesh; and train the one or more machine learning algorithms using the vector of geometric features and the associated classification label of classified elements of at least a subset of the another dataset, to produce the one or more classification models.

21. The non-transitory electronic device readable medium of claim 20, further comprising instructions that when executed are operable to:

split the another dataset into a training dataset and a validation dataset;

compute a score for each classification model using the validation dataset; and select a best classification model from the one or more classification models based on the score.

* * * * *

UNITED STATES PATENT AND TRADEMARK OFFICE
CERTIFICATE OF CORRECTION

PATENT NO. : 11,521,026 B2
APPLICATION NO. : 17/034844
DATED : December 6, 2022
INVENTOR(S) : Marc-André Lapointe et al.

Page 1 of 1

It is certified that error appears in the above-identified patent and that said Letters Patent is hereby corrected as shown below:

In the Claims

Claim 18:
Column 11, Line 34:
"the unclassified elements;"
Should read:
-- the unclassified elements; and --

Claim 19:
Column 12, Line 12:
"with one or more Classification models and the vector"
Should read:
-- with one or more classification models and the vector --

Signed and Sealed this
Twenty-third Day of September, 2025

John A. Squires
*Director of the United States Patent and Trademark Office*